United States Patent [19]

White et al.

[11] Patent Number: 5,338,606
[45] Date of Patent: Aug. 16, 1994

[54] POLYESTER COMPOSITIONS

[75] Inventors: Alan W. White, Kingsport; Barry G. Pearcy, Church Hill; Marc A. Strand; Joey C. Carico, both of Kingsport, all of Tenn.

[73] Assignee: Eastman Chemical Company, Kingsport, Tenn.

[21] Appl. No.: 88,956

[22] Filed: Jul. 12, 1993

Related U.S. Application Data

[60] Division of Ser. No. 863,906, Apr. 6, 1992, abandoned, which is a division of Ser. No. 777,942, Oct. 17, 1991, Pat. No. 5,132,391, which is a continuation-in-part of Ser. No. 546,953, Jul. 2, 1990, abandoned.

[51] Int. Cl.$^5$ .............................................. B32B 15/08
[52] U.S. Cl. ................................... 428/458; 528/272; 528/274; 528/287; 528/302; 528/308; 528/308.6; 524/115; 524/121; 524/128; 524/147; 524/222; 524/323; 524/710; 524/736; 524/741; 428/480; 428/481; 428/357
[58] Field of Search ............... 528/272, 274, 287, 302, 528/308.1, 308.6; 524/115, 121, 128, 147, 222, 323, 710, 736, 741; 428/480, 481, 458, 357

[56] References Cited

U.S. PATENT DOCUMENTS 3,386,952 6/1968 Gleim et al. ..................... 524/141

Primary Examiner—Samuel A. Acquah
Attorney, Agent, or Firm—J. Frederick Thomsen; William P. Heath, Jr.

[57] ABSTRACT

Disclosed are polyester adhesive compositions which exhibit increased melt viscosity and improved adhesion comprised of residues of terephthalic acid, ethylene glycol and diethylene glycol and having reacted therewith or copolymerized therein the residue of a phosphite ester compound and optionally containing a phenolic antioxidant. Also disclosed are articles coated with the polyester compositions and bonded laminate articles based on the compositions.

6 Claims, No Drawings

POLYESTER COMPOSITIONS

This is a divisional application of copending application Ser. No. 07/863,906 filed Apr. 6, 1992, now abandoned which is a divisional of Ser. No. 07/777,942 filed Oct. 17, 1991, U.S. Pat. No. 5,132,391, which is a continuation-in-part of Ser. No. 07/546,953 filed Jul. 2, 1990 now abandoned.

This invention pertains to certain novel polyester compositions which exhibit increased melt viscosity and improved adhesion. More particularly, this invention pertains to novel compositions comprising a polyester containing residues of terephthalic acid, ethylene glycol and diethylene glycol and having reacted therewith or copolymerized therein the residue of a phosphite ester compound. This invention also pertains to such compositions which additionally contain a phenolic antioxidant.

Heat resistant polyesters comprised of terephthalic acid residues and a critical ratio of ethylene glycol and diethylene glycol residues are described in U.S. Pat. No. 4,352,925 which also contains a summary of the prior art pertaining to diethylene glycol-containing polyesters. The polyesters disclosed in U.S. Pat. No. 4,352,925 are, in general, suitable for bonding poly(ethylene terephthalate)-coated substrates such as poly(ethylene terephthalate)-coated paperboard and similar materials. It has been found, however, that the polyesters of U.S. Pat. No. 4,352,925 are not entirely satisfactory in adhering to metals such as aluminum, particularly when metal flat stock is coated with the polyester or a multi-layer structure containing the polyester and subsequently subjected to shaping processes. For example, the coated stock may be shaped into containers or lids designed for the packaging of comestibles.

We have discovered that the adhesion possessed by polyesters containing residues of terephthalic acid, ethylene glycol and diethylene glycol is improved substantially by the inclusion in the polyesters of the reactive residues of one or more phosphite ester compounds. The polyesters provided by our invention also exhibit increased melt viscosity which enhances the preparation of uniform coatings of the polyesters on flat stock by conventional extrusion processes and facilitates the coextrusion of the polyesters with other polymers such as poly(ethylene terephthalate). The coextrusion of polymers is very difficult when the melt viscosities of the polymers are significantly different at the extrusion temperature. Increased melt viscosity also is advantageous since polymers having low melt viscosities flow to the edge of extruded sheeting and therefore do not provide uniform film thickness. We also have found that the adhesion and melt viscosity can be further improved by the inclusion of a phenolic antioxidant in the phosphite residue-containing polyesters.

The compositions of this invention comprise a polyester containing:
  A. dicarboxylic acid residues comprising at least 75 mole percent of terephthalic acid residues; and
  B. diol residues consisting essentially of residues of (i) ethylene glycol and (ii) diethylene glycol wherein the mole ratio of (i):(ii) is about 9:1 to 1:1;

wherein the polyester has copolymerized therein or reacted therewith a phosphite residue. The improved adhesion and melt viscosity possessed by our novel polyesters is unique since additives which increase melt viscosity normally result in a decrease in adhesion.

Thus, we have found that physical admixtures of the polyesters specified above with phosphite ester compounds, obtained, for example, by melt blending a polyester with a phosphite ester compound, exhibit significantly inferior adhesion as compared to the unmodified polyesters.

Up to about 25 mole percent of the dicarboxylic acid residue component of the polyesters may consist of residues of one or more aliphatic, alicyclic, or aromatic dicarboxylic acids other than terephthalic acid. Examples of such other dicarboxylic acids include isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

The polyesters of the present invention may be prepared according to conventional esterification/transesterification processes wherein terephthalic acid, or an ester-forming derivative thereof such as dimethyl terephthalate, optionally in combination with another dicarboxylic acid or ester-forming equivalent thereof, is reacted with a mixture of ethylene and diethylene glycols in the presence of an esterification/transesterification catalyst such as one or more manganese, titanium, zinc or tin compounds which are soluble in the reaction mixture. The reaction mixture is then subjected to polycondensation conditions of increasing temperature and decreasing pressure to obtain the polyester. Typically the first stage of the process (esterification/transesterification) is performed at ambient pressure at temperatures in the range of about 160° to 240° C. The second (polycondensation) stage of the manufacturing process is carried out at temperatures over the range of about 250° to 300° C., preferably not above about 280° C. since the use of higher temperatures affects detrimentally the thermal stability of the polyester. The polycondensation is carried out in the presence of a catalyst such as a soluble titanium, germanium, tin or antimony compound. The catalyst or catalyst components may be added individually or in combination at the commencement of the manufacturing process. The use of antimony is not preferred since the presence of the phosphite ester compound in combination with antimony results in the formation of an undesirably discolored polyester.

The phosphite residue component of our novel polyesters may be represented by the structure

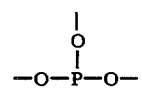

wherein at least one, preferably at least two, of the bonds of the phosphite residue is bonded to an ethylene moiety of the diol residues of the polyesters. The particular phosphite residue-containing compound is not critical and the phosphite residue may be derived from a wide variety of phosphorus compounds, especially phosphite esters.

Examples of the phosphite residue-containing compounds which may be used include compounds having the formula

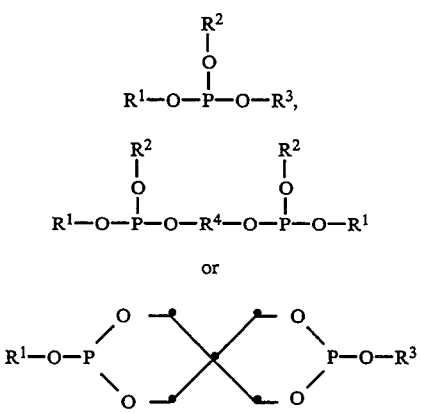

wherein $R^1$, $R^2$ and $R^3$ are independently selected from a wide variety of organic residues such as alkyl radicals, e.g., alkyl, including unsubstituted and substituted alkyl, of up to about 20 carbon atoms; alkenyl of up to about 10 carbon atoms; cycloalkyl, including unsubstituted and substituted cycloalkyl, having about 5 to 7 ring carbon atoms; and aryl, including unsubstituted and substituted aryl, having about 6 to 10 ring carbon atoms $R^1$ and $R^2$, in combination, may represent alkylene, cycloalkylene or arylene radicals. The divalent groups represented by $R^4$ may be selected from alkylene, cycloalkyl and arylene radicals. Any phosphite ester compound, including polymeric phosphite esters, which may be obtained by the reaction of phosphorus trichloride with alcohols, including phenols, diols, triols and tetraols and the like may be used as the source of the phosphite anion in the preparation of the polyesters of our invention. Generally, the molecular weight of the phosphite ester may be in the range of about 132 (trimethyl phosphite) to 1000 or greater. We have found that tris(nonylphenyl) phosphite (MW about 693), available as NAUGARD-P, as well as trimethyl phosphite, is a suitable phosphite ester compound. Another useful phosphite ester compound has the structure:

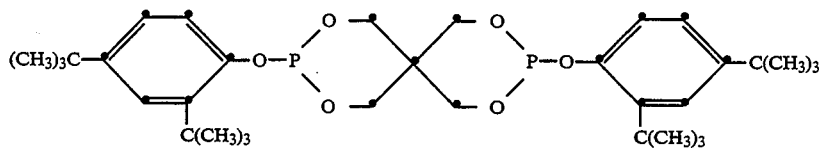

which has an approximate molecular weight of 604 and is available as ULTRANOX 626 antioxidant.

The adhesion-promoting amount of phosphite residue-containing compound required can vary substantially depending, for example, on the particular phosphite ester employed and polyester being prepared and the end use for which the polyester is designed. Typically, the amount of phosphite residue-containing compound used will result in the polyester containing at least 100 parts per million (ppm) phosphorus, based on the weight of the polyester, attributable to the reactive residue of the phosphite residue-containing compound. Preferably, the phosphite residue-containing compound reacted or copolymerized with the polyester gives a phosphorus concentration of about 200 to 800 ppm. The phosphite residue-containing compound may be added to the manufacturing process at any time prior to the completion of the polycondensation stage. The phosphite ester compound preferably is added at or near the completion of the esterification/transesterification stage since its presence may inhibit the rate of the esterification/transesterification reaction.

The polyester compositions described hereinabove preferably are comprised of:
A. dicarboxylic acid residues consisting essentially of terephthalic acid residues; and
B. diol residues consisting essentially of residues of (i) ethylene glycol and (ii) diethylene glycol wherein the mole ratio of (i):(ii) is about 3:1 to 1:1;

wherein the polyester has copolymerized therein or reacted therewith about 200 to 800 ppm phosphite residue.

A second embodiment of our novel compositions pertains to the presence of a phenolic antioxidant in the polyesters described hereinabove and thus comprises a polyester containing:
A. diacid residues comprising at least 75 mole percent of terephthalic acid residues; and
B. diol residues consisting essentially of residues of (i) ethylene glycol and (ii) diethylene glycol wherein the mole ratio of (i):(ii) is about 9:1 to 1:1;

wherein the polyester (1) has copolymerized therein or reacted therewith a phosphite residue as described above and (2) contains a phenolic antioxidant. We have found that the presence of both a phosphite residue, e.g., a phosphite ester residue, and a phenolic antioxidant impart to the polyesters improved adhesion and increased melt viscosities as compared to the polyesters containing only the phosphite residues. The means by which the phenolic compound enhances adhesion is not known since its use alone, i.e., in the absence of the phosphite residues, typically causes a decrease in adhesion. This decrease in adhesion is observed with the phenolic antioxidant 2,2-bis[[3-[3,5-bis(1,1-dimethylethyl)-4-hydroxyphenyl]-1-oxopropoxy]methyl]-1,3-propanediyl 3,5-bis(1,1-dimethylethyl)-4-hydroxybenzenepropanoate (IRGANOX 1010 stabilizer) presumably because the melt viscosity is increased.

The particular phenolic antioxidant used is not critical and may be selected from the various compounds described in the literature for use as oxidation inhibitors for organic materials, particularly for polymeric materials. Examples of suitable phenolic antioxidants include compounds having the structure:

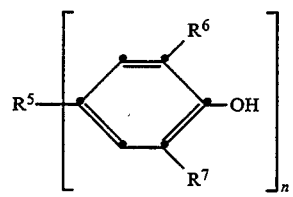

wherein n is from 1 to 4, $R^5$ is a radical selected from the group consisting of neopentanetetrayltetrakis[oxy(3-oxotrimethylene)]; phosphinylidynetrioxy; 2,4,6-trimethyl-1,3,5-benzenetriyltrimethylene; alkylene having 1 to 5 carbon atoms; alkyl having 1 to 12 carbon atoms; 2,4,6-trioxo-1,2,3,4,5,6-hexahydro-s-triazine-1,3,5-triyl)tris(3-oxotrimethylene); and 3-$C_1$-$C_{20}$-alkoxy-3-oxopropyl, e.g., 3-(octadecyloxy)-3-oxopropyl.

$R^6$ is a tertiary alkyl containing 4 to about 12 carbon atoms such as 2-methyl-2-propyl, 2-methyl-2-butyl and 2,4,4-trimethyl-2-pentyl; and $R^7$ is alkyl of up to about 12 carbon atoms.

The commercially-available antioxidants 2,2-bis[[3-[3,5-bis(1,1-dimethylethyl)-4-hydroxyphenyl]-1-oxopropoxy]methyl]-1,3-propanediyl 3,5-bis(1,1-dimethylethyl)-4-hydroxybenzenepropanoate (IRGANOX 1010 stabilizer) and 1,3,5-trimethyl-2,4,6-tris[3,5-bis(1,1-dimethylethyl)-4-hydroxybenzyl]benzene (ETHANOX-330 stabilizer) are particularly preferred. The adhesion-promoting amount of the phenolic antioxidant is not critical but normally should be at least 0.03 weight percent based on the weight of the polyester composition. Preferably, the concentration of the phenolic antioxidant is in the range of about 0.1 to 0.3 weight percent based on the weight of the polyester composition.

The phenolic antioxidant may be incorporated into the polyesters at any time during the preparation of the polyester or subsequent thereto. We have found that the phenolic antioxidant is most conveniently incorporated into the polyester by adding it at the commencement of the polyester manufacturing process.

The polyesters and polyester compositions provided by the present invention have inherent viscosities in the range of about 0.4 to 0.9, preferably about 0.6 to 0.8, deciliters per gram (dL/g). The inherent viscosities given herein are determined at 25° C. using 0.5 g of polymer per 100 mL of solvent consisting of 60 weight percent phenol and 40 weight percent tetrachloroethane. The polyesters and compositions obtained according to the procedures described above may be crystallized, if necessary, to facilitate the drying and handling thereof. Such crystallization may be accomplished by immersing the polyester in hot water, e.g., 90°–98° C., for a period of time, e.g., 20–60 minutes, to effect crystallization.

Our novel polyesters and polyester compositions and their preparation are further illustrated by the following examples. The mole percent diethylene glycol residues present in the polyesters was determined by nuclear magnetic resonance spectrometry. The glass transition temperature (Tg) and melting temperature (Tm) were determined by differential scanning calorimetry (DSC) on the second heating cycle at a scanning rate of 20° C. per minute. The number average molecular weight (Mn) and weight average molecular weight (Mw) were determined by gel permeation chromatography. Parts per million phosphorus were determined by X-ray spectroscopy.

EXAMPLE 1

The following materials are placed in a 500-mL single-necked, round-bottom flask:
- 96.0 g (0.495 mol) dimethyl terephthalate
- 46.7 g (0.754 mol) ethylene glycol
- 25.5 g (0.240 mol) diethylene glycol
- 55 ppm titanium from a n-butanol solution of tetraisopropyl titanate
- 80 ppm cobalt from an ethylene glycol solution of cobalt acetate
- 75 ppm manganese from an ethylene glycol solution of manganese diacetate The flask is equipped with a nitrogen inlet, stirrer, vacuum outlet, and condensing flask. The flask and contents are heated at 200° C. in a Belmont metal bath for 60 minutes, at 210° C. for 90 minutes and at 220° C. for 80 minutes with a nitrogen sweep over the reaction mixture. Trimethyl phosphite (0.62 g; 0.005 mol) is added to the reaction mixture which is then heated at 220° C. for an additional 30 minutes. The reaction temperature is increased to 280° C. and, after 5 minutes, the pressure within the flask is reduced to less than 0.5 torr and polycondensation is continued for 35 minutes. The flask is removed from the metal bath and is allowed to cool in a nitrogen atmosphere for 16–20 hours while the polymer crystallizes. The resulting polymer has an inherent viscosity of 0.656 dL/g, a phosphorus content of 403 ppm and an ethylene glycol residue:diethylene residue mole ratio (EG:DEG) of 66:34. Tg=56.5; Tm=181° C.; Mn=21,800; Mw=45,400.

EXAMPLE 2

The following materials are placed in a 500-mL single-necked, round-bottom flask:
- 96.0 g (0.495 mol) dimethyl terephthalate
- 46.7 g (0.754 mol) ethylene glycol
- 26.5 g (0.250 mol) diethylene glycol
- 55 ppm titanium from a n-butanol solution of tetraisopropyl titanate
- 80 ppm cobalt from an ethylene glycol solution of cobalt acetate
- 75 ppm manganese from an ethylene glycol solution of manganese diacetate The flask is equipped with a nitrogen inlet, stirrer, vacuum outlet, and condensing flask. The flask and contents are heated at 200° C. in a Belmont metal bath for 60 minutes, at 210° C. for 90 minutes and at 220° C. for 80 minutes with a nitrogen sweep over the reaction mixture. Triphenyl phosphite (1.60 g; 0.0052 mol) is added to the reaction mixture which is then heated at 220° C. for an additional 30 minutes. Then, antimony (220 ppm; from an ethylene glycol solution of antimony trioxide) is added, the reaction temperature is increased to 280° C. and, after 5 minutes, the pressure within the flask is reduced to less than 0.5 torr and polycondensation is continued for 35 minutes. The flask is removed from the metal bath and is allowed to cool in a nitrogen atmosphere for 16–20 hours while the polymer crystallizes. The resulting polymer has an inherent viscosity of 0.737 dL/g, a phosphorus content of 462 ppm and an EG:DEG ratio of 69:31. Tg=55.7° C.; Tm=176° C.; Mn=22,600; Mw=63,300.

EXAMPLE 3

The following materials are placed in a 500-mL, single-necked, round-bottom flask:
- 96.0 g (0.495 mol) dimethyl terephthalate
- 50.3 g (0.811 mol) ethylene glycol
- 27.3 g (0.258 mol) diethylene glycol
- 80 ppm titanium from a n-butanol solution of tetraisopropyl titanate
- 83 ppm cobalt from an ethylene glycol solution of cobalt acetate 75 ppm manganese from an ethylene glycol solution of manganese diacetate The flask is equipped with a nitrogen inlet, stirrer, vacuum outlet, and condensing flask. The flask and contents are heated at 200° C. in a Belmont metal bath for 60 minutes, at 210° C. for 90 minutes and at 220° C. for 60 minutes with a nitrogen sweep over the reaction mixture. Tris(nonylphenyl phosphite (1.7 g; 0.0025 mol) is added to the reaction mixture which is then heated at 220° C. for an additional 30 minutes. The reaction temperature is increased to 280° C. and, after 5 minutes, the pressure within the flask is reduced to less than 0.5 torr and polycondensation is continued for 35 minutes. The flask is removed from the metal bath and is allowed to cool in a nitrogen atmosphere for 16–20 hours while the polymer crystallizes. The resulting polymer has an inherent viscosity of 0.729 dL/g, a phosphorus content of 673 and an EG:DEG ratio of 64:36.

EXAMPLE 4

The following materials are placed in a 500-mL, single-necked, round-bottom flask:
- 96.0 g (0.495 mol) dimethyl terephthalate
- 50.1 g (0.811 mol) ethylene glycol
- 27.3 g (0.250 mol) diethylene glycol
- 120 ppm titanium from a n-butanol solution of tetraisopropyl titanate
- 83 ppm cobalt from an ethylene glycol solution of cobalt acetate
- 75 ppm manganese from an ethylene glycol solution of manganese diacetate
- 0.1 g (0.1 wt %) 1,3,5-trimethyl-2,4,6-tris-[3,5-bis(1,1-dimethylethyl)-4-hydroxybenzyl]benzene The flask is equipped with a nitrogen inlet, stirrer vacuum outlet, and condensing flask. The flask and contents are heated at 200° C. in a Belmont metal bath for minutes, at 210° C. for 90 minutes and at 220° C. for 60 minutes with a nitrogen sweep over the reaction mixture. Tris(nonylphenyl phosphite (3.3 g; 0.005 mol) is added to the reaction mixture which is then heated at 220° C. for an additional 30 minutes. The reaction temperature is increased to 280° C. and, after 5 minutes, the pressure within the flask is reduced to less than 0.5 torr and polycondensation is continued for 35 minutes. The flask is removed from the metal bath and is allowed to cool in a nitrogen atmosphere for 16–20 hours while the polymer crystallizes. The resulting polymer has an inherent viscosity of 0.720 dL/g, a phosphorus content of 550 ppm and an EG:DEG ratio of 65:35. Tg=57.5° C.; Tm=178° C.; Mn=21,600; Mw=70,500.

EXAMPLE 5

The following materials are placed in a 3-liter pressure vessel:
- 830.6 g (5.00 mol) terephthalic acid
- 434.5 g (7.00 mol) ethylene glycol
- 212.2 g (2.00 mol) diethylene glycol The vessel is pressurized to 35 psi, heated to 255° C. over a 2 hour period and maintained at 255° C. until the theoretical amount of water is collected through a compensating valve in the vessel. The pressure vessel is cooled to a temperature below 200° C., the pressure is released and the oligomer contents of the vessel are transferred to a 500 mL flask to which is added tris-(nonylphenyl) phosphite (2.11 g; NAUGARD-P antioxidant), 2,2-bis[[3-[3,5-bis(1,1-dimethylethyl)-4-hydroxyphenyl]-1-oxopropoxy]methyl]-1,3-propanediyl 3,5-bis-(1,1-dimethylethyl)-4-hydroxybenzenepropanoate (0.183 g; IRGANOX 1010 antioxidant) and Ti (20 ppm) from a n-butanol solution of tetraisopropyl titanate. The contents of the flask are melted at 250° C. and polycondensation is carried out for 1 hour at 0.5 torr as described in Example 1. The polyester obtained has an inherent viscosity of 0.65 dL/g.

EXAMPLE 6

The following materials are placed in a 500-mL, single-necked, round-bottom flask:
- 96.5 g (0.498 mol) dimethyl terephthalate
- 49.7 g (0.801 mol) ethylene glycol
- 27.1 g (0.256 mol) diethylene glycol
- 80 ppm titanium from a n-butanol solution of tetraisopropyl titanate
- 83 ppm cobalt from an ethylene glycol solution of cobalt acetate
- 75 ppm manganese from an ethylene glycol solution of manganese diacetate
- 0.16 g (0.15 wt %) 2,2-bis[[3-[3,5-bis(1,1-dimethylethyl)-4-hydroxyphenyl]-1-oxopropoxy]methyl]-1,3-propanediyl 3,5-bis -(1,1-dimethylethyl)-4-hydroxybenzenepropanoate (IRGANOX 1010 antioxidant)

The flask is equipped with a nitrogen inlet, stirrer, vacuum outlet, and condensing flask. The flask and contents are heated at 200° C. in a Belmont metal bath for 60 minutes, at 210° C. for 90 minutes and at 220° C. for 60 minutes with a nitrogen sweep over the reaction mixture. Tris(nonylphenyl phosphite (1.7 g) is added to the reaction mixture which is then heated at 220° C. for an additional 30 minutes. The reaction temperature is increased to 280° C. and, after 5 minutes, the pressure within the flask is reduced to less than 0.5 torr and polycondensation is continued for 90 minutes. The flask is removed from the metal bath and is allowed to cool in a nitrogen atmosphere for 16–20 hours while the polymer crystallizes. The resulting polymer has an inherent viscosity of 0.781 dL/g, a phosphorus content of 375 ppm and an EG:DEG ratio of 66:34. Tg=59.7° C.; Mn=25,300; Mw=71,200.

EXAMPLE 7

The following materials are placed in a 500-mL, single-necked, round-bottom flask:
- 96.8 g (0.499 mol) dimethyl terephthalate
- 50.0 g (0.808 mol) ethylene glycol
- 27.3 g (0.257 mol) diethylene glycol
- 55 ppm titanium from a n-butanol solution of tetraisopropyl titanate
- 83 ppm cobalt from an ethylene glycol solution of cobalt acetate
- 75 ppm manganese from an ethylene glycol solution of manganese diacetate The flask is equipped with a nitrogen inlet, stirrer, vacuum outlet, and condensing flask. The flask and contents are heated at 200° C. in a Belmont metal bath for 60 minutes, at 210° C. for 90 minutes and at 220° C. for 60 minutes with a nitrogen sweep over the reaction mixture. ULTRANOX stabilizer composition (1.7 g slurried in ethylene glycol) is added to the reaction mixture which is then heated at 220° C. for an additional 30 minutes. The reaction temperature is increased to 280° C. and, after 5 minutes, the pressure within the flask is reduced to less than 0.5 torr and polycondensation is continued for 25 minutes. The flask is removed from the metal bath and is allowed to cool in a nitrogen atmosphere for 16–20 hours while the polymer crystallizes. A blend of several polyesters prepared according to this procedure has an inherent viscosity of 0.740 dL/g, a phosphorus content of 250 ppm and an EG:DEG ratio of 68:32. Tg=57.9° C.; Tm=176° C.; Mn=25,300; Mw=72,800.

COMPARATIVE EXAMPLE 1

Dried pellets (750 g) of a polyester consisting of terephthalic acid residues and diol residues consisting of 62 mol percent ethylene glycol residues and 38 mol percent diethylene glycol residues and having an inherent viscosity of 0.71 dL/g and tris(nonylphenyl) phosphite (15 g) are charged to a 16 ounce jar and the jar is sealed and rolled for 16–20 hours to mix the contents. The resulting mixture then is melt blended and pelletized at 240° C. using a Werner-Pfliderer extruder. The temperature profile of the extruded is: Zone 1=225° C.; Zone 2=240° C., Zone 3=240° C., Zone 4=245° C. The compounded polyester composition is dried at 80°–85° C. in a vacuum oven and extruded from a Brabender extruder into film having an approximate thickness of 76 microns and an inherent viscosity of 0.55 dL/g.

COMPARATIVE EXAMPLE 2

The polyester of this example used in the evaluations described hereinbelow consists of terephthalic acid residues and diol residues consisting of 65 mol percent ethylene glycol residues and 35 mol percent diethylene glycol residues and having an inherent viscosity of 0.71 dL/g. The polyester does not contain any phosphite residue or phenolic antioxidant compound.

COMPARATIVE EXAMPLE 3

The following materials are placed in a 500-mL, single-necked, round-bottom flask:
- 97.1 g (0.500 mol) dimethyl terephthalate
- 46.9 g (0.756 mol) ethylene glycol
- 29.7 g (0,280 mol) diethylene glycol
- 80 ppm titanium from a n-butanol solution of tetraisopropyl titanate
- 83 ppm cobalt from an ethylene glycol solution of cobalt acetate
- 75 ppm manganese from an ethylene glycol solution of manganese diacetate The flask is equipped with a nitrogen inlet, stirrer, vacuum outlet, and condensing flask. The flask and contents are heated at 200° C. in a Belmont metal bath for minutes, at 210° C. for 90 minutes and at 220° C. for 90 minutes with a nitrogen sweep over the reaction mixture. A mixed phosphate ester composition (90 ppm phosphorus; from an n-butanol solution of ZONYL A) is added to the reaction mixture and the temperature is increased to 280° C. and, after 5 minutes, the pressure within the flask is reduced to less than 0.5 torr. Several batches are prepared using the above-described procedure and polycondensation times of 35 to 60 minutes. The polyesters have inherent viscosities in the range of 0.70 to 0.80 dL/g and a blend of the polyesters has an inherent viscosity of 0.75 dL/g and an EG:DEG ratio of 3.2:36.8. Tg=58.4° C.; Mn=25,700; Mw=60,600.

Each of the polyesters described in the preceding examples is ground in a Thomas-Wiley laboratory mill (Model 4) with a 3 mm screen to a particle size of approximately 3 mm and dried in a vacuum oven at 85° C. for 6 hours.

The melt viscosity of each of the polyesters of Example 3, 4 and 6 and Comparative Example 2 (C-2) is measured on a Rheometrics mechanical spectrometer (Model 7220) at 220° C. from 1 to 100 radians per second. The viscosity of the polyesters is set forth in Table I wherein Frequency is given in rad/sec and viscosity in poise.

TABLE I

| Frequency | Viscosity of Polyester of Example: | | | | | |
|---|---|---|---|---|---|---|
| | 3 | 4 | 6 | 7 | C-2 | C-3 |
| 1.0 | 14,086 | 26,868 | 17,300 | 23,190 | 7,790 | 15,400 |
| 2.5 | 13,018 | 23,678 | 16,500 | 19,910 | 7,690 | 14,900 |
| 4.0 | 11,871 | 20,466 | 15,300 | 18,030 | 7,190 | 13,900 |
| 10.0 | 10,375 | 16,880 | 12,700 | 13,860 | 6,800 | 12,300 |
| 25.0 | 8,666 | 13,895 | 10,900 | 10,800 | 6,220 | 11,300 |
| 40.0 | 7,839 | 12,306 | 9,800 | 9,100 | 5,820 | 10,400 |
| 100.0 | 6,273 | 9,689 | 8,040 | 7,150 | 4,990 | 8,800 |

The polyester compositions of our invention exhibit improved adhesion to metal substrates and therefore are useful as protective coatings for metal objects and as adhesives for bonding metal substrates to various other materials such as the same or different metal substrates, paper and other cellulose-based materials and other polyesters such as poly(ethylene terephthalate). The polyester compositions may be used in the form of melts, powders, pellets, film or solutions in one or more suitable, volatile solvents. The described materials can be bonded together with our novel polyester compositions by coating one or both of the materials to be bonded with one of our polyester compositions and subsequently forming a bonded laminate structure by contacting the coated material with a second material and applying heat to the materials. Alternatively, the polyester composition in the form of a powder or film may be interposed between the materials to be bonded followed by heating the layers of materials to effect bonding.

Our invention therefore includes materials such as metals, paper and paperboard, and synthetic polymers having coated thereon one or more of the polyesters compositions described hereinabove. Typically, the thickness of the coating is in the range of about 1 to 50 microns. The preferred coated articles comprise aluminum, paper, paperboard and poly(ethylene terephthalate). Our invention also includes two materials adhered to each other by our novel compositions. Such adhered materials may comprise a bonded laminate comprising, in order, (1) a metal substrate, (2) one of the polyester compositions described above and (3) another material such as a metal, paper, paperboard or a synthetic polymeric material. The preferred bonded laminates of our invention comprise, in order, (1) aluminum, (2) one of the polyester compositions and (3) aluminum or poly(ethylene terephthalate.

The utility of our novel compositions as adhesives is further illustrated by the following examples. The peel strength of each of the polyesters is determined by two procedures, both of which are modification of ASTM "T-Peel" Test D-1876-61-T. In the first procedure (Procedure A), a film approximately 76 microns thick is prepared from each polyester by compression molding a small portion of the polyester between two steel plates in a pneumatic press at a temperature of about 270° C. and a pressure of about 36 psi. A 1 inch square section of the film is sandwiched between the ends of 2 aluminum strips (1 inch×4 inch by 0.012 inch thick) and the 3-layer laminate is bonded at 200° C. and 36 psi for 15 seconds using a pneumatic press with heated plates. The test specimen is allowed to cool to room temperature and then the non-bonded portions of the aluminum strips are bent to opposing 90° angles (relative to the bonded portions of the strips) in the shape of a "T".

The peel strength of the bond is determined using a Chatilion force tester. One end of the non-bonded aluminum strip is securely fastened in a clamp and the clamp is hooked to the force tester. While holding the force tester (with the aluminum strip attached thereto), the end of the other non-bonded aluminum strip is pulled manually downward in the direction opposite the force tester. The force, measured in pounds per square inch, required to break the bond is read directly from the scale on the force tester.

The peel strength values (pounds per square inch) of the polyester compositions of Examples 1 and 2 and Comparative Examples 2 (C-2) obtained according to Test Procedure A are set forth in Table III. The values given are averages of a plurality (5 or 6) of peel strength tests performed for each of the polyesters.

TABLE III

| Polyester of Example: | Peel Strength |
|---|---|
| 1 | 3.2 |
| 2 | 3.5 |
| C-2 | 2.6 |

The second procedure (Procedure B) is similar to Procedure A with the following variations: (i) the film of each polyester is prepared by processing each polyester in an Brabender extruder and extruding the film (approximately 76 microns thick) at about 240° C.; (ii) the bonding temperature used is 220° C. rather than 200° C.; (iii) after bonding, the bonded laminate is quenched in ice water for 5 seconds; and (iv) peel strengths are measured on an Instron Universal Testing Instrument (Model TT-1125) with a crosshead speed of 2 inches per minute.

The peel strengths of each of the polyesters of Examples 3, 4 and 6 and Comparative Examples 1 and 2 determined in accordance with Procedure B are set forth in Table IV. The values given (pounds per inch) are averages of a plurality (10) test performed as described on each polyester.

TABLE IV

| Polyester of Example: | Peel Strength |
|---|---|
| 3 | 8.4 |
| 4 | 10.7 |
| 6 | 5.8 |
| 7 | 7.6 |
| C-1 | 1.9 |
| C-2 | 5.0 |
| C-3 | 0.6 |

It is apparent from the data appearing in Tables I through IV that the combination of properties exhibited by the polyester compositions provided by this invention are substantially superior to those exhibited by the polyesters of Comparative Examples 1 and 2.

The invention has been described in detail with particular reference to preferred embodiments thereof, but it will be understood that variations and modifications can be effected within the spirit and scope of the invention.

We claim:

1. A coated article comprising a metal, cellulose material or synthetic polymer having coated thereon a a polyester composition comprising a polyester containing:
   A. dicarboxylic acid residues comprising at least 75 mole percent of terephthalic acid residues; and
   B. diol residues consisting essentially of residues of (i) ethylene glycol and (ii) diethylene glycol wherein the mole ratio of (i):(ii) is about 9:1 to 1:1;
wherein the polyester has copolymerized therein or reacted therewith a phosphite residue.

2. A coated article according to claim 1 comprising aluminum or poly(ethylene terephthalate) having coated thereon a polyester composition comprising a polyester having an inherent viscosity of about 0.4 to 0.9 and having copolymerized therein or reacted therewith a phosphite residue in an amount which gives a phosphorus concentration of at least 100 ppm based on the weight of the polyester.

3. A coated article according to claim 1 comprising aluminum or poly(ethylene terephthalate) having coated thereon a polyester composition comprising a polyester having an inherent viscosity of about 0.4 to 0.9 containing:
   A. dicarboxylic acid residues consisting essentially of terephthalic acid residues; and
   B. diol residues consisting essentially of residues of (i) ethylene glycol and (ii) diethylene glycol wherein the mole ratio of (i):(ii) is about 3:1 to 1:1;
wherein the polyester has copolymerized therein or reacted therewith a phosphite residue in an amount which gives a phosphorus concentration of about 200 to 800 ppm based on the weight of the polyester.

4. A coated article comprising a metal, cellulose material or synthetic polymer having coated thereon a polyester composition comprising a polyester containing:
   A. dicarboxylic acid residues comprising at least 75 mole percent of terephthalic acid residues; and
   B. diol residues consisting essentially of residues of (i) ethylene glycol and (ii) diethylene glycol wherein the mole ratio of (i):(ii) is about 9:1 to 1:1;
wherein the polyester (1) has copolymerized therein or reacted therewith a phosphite residue and (2) contains a phenolic antioxidant.

5. A coated article according to claim 4 comprising aluminum or poly(ethylene terephthalate) having coated thereon a polyester composition comprising a polyester having an inherent viscosity of about 0.4 to 0.9 and (1) having copolymerized therein or reacted therewith a phosphite residue in an amount which gives a phosphorus concentration of at least 100 ppm based on the weight of the polyester and (2) containing at least 0.03 weight percent, based on the weight of the polyester composition, of a phenolic antioxidant.

6. A coated article according to claim 4 comprising aluminum or poly(ethylene terephthalate) having coated thereon a polyester composition comprising a polyester having an inherent viscosity of about 0.4 to 0.9 containing:
   A. dicarboxylic acid residues consisting essentially of terephthalic acid residues; and
   B. diol residues consisting essentially of residues of (i) ethylene glycol and (ii) diethylene glycol wherein the mole ratio of (i):(ii) is about 3:1 to 1:1;
wherein the polyester (1) has copolymerized therein or reacted therewith a phosphite residue in an amount which gives a phosphorus concentration of about 200 to 800 ppm based on the weight of the polyester and (2) contains about 0.1 to 0.3 weight percent, based on the weight of the polyester, of a phenolic antioxidant.

* * * * *